Jan. 20, 1970

TAISUKE TSUGAMI 3,491,243

AUTHENTICATION APPARATUS TO MEASURE COLOR
CHARACTERISTICS OF PAPER DOCUMENTS

Filed Aug 26, 1966

INVENTOR.
TAISUKE TSUGAMI
BY
Oldham & Oldham
ATTYS.

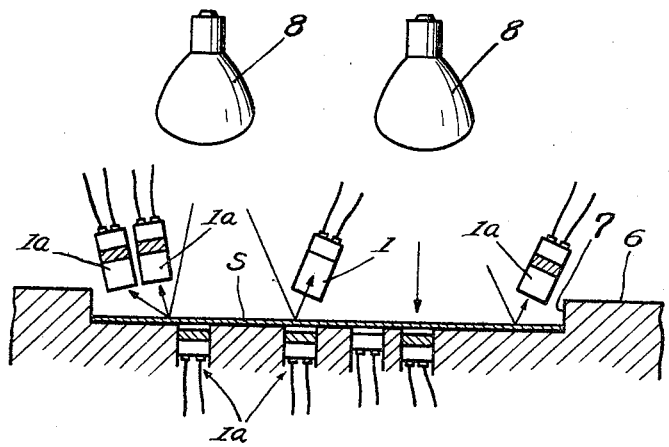
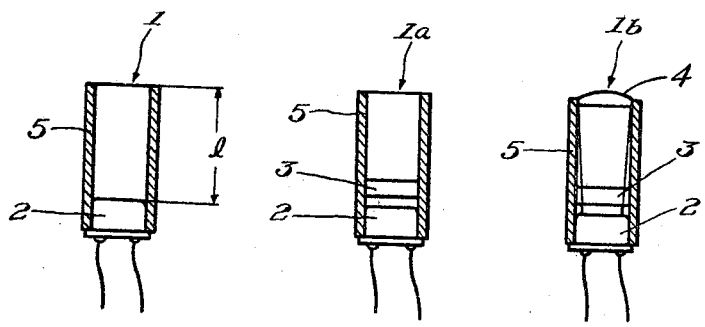

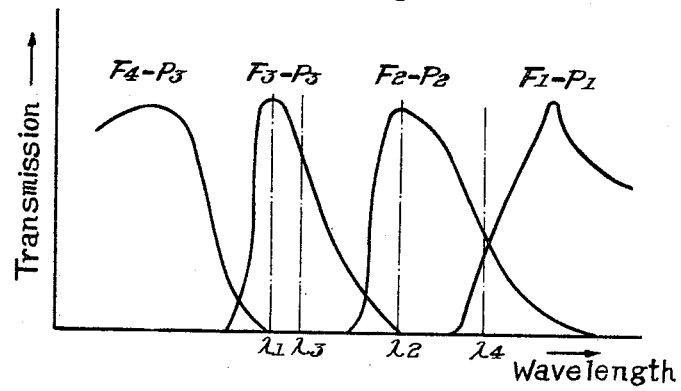
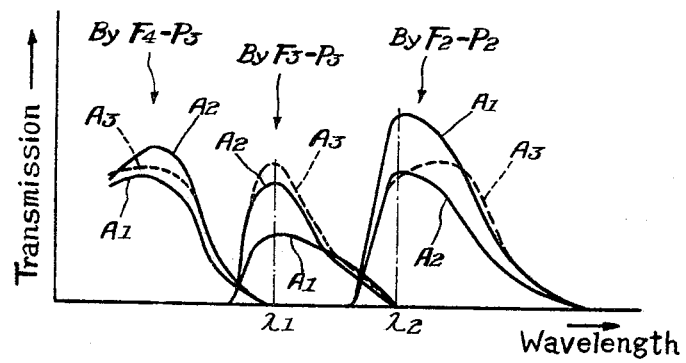
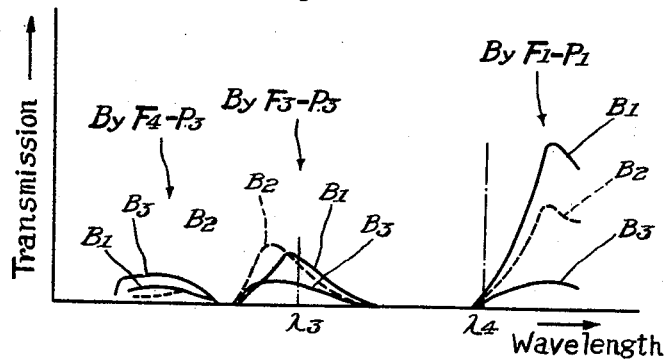

United States Patent Office 3,491,243
Patented Jan. 20, 1970

3,491,243
AUTHENTICATION APPARATUS TO MEASURE COLOR CHARACTERISTICS OF PAPER DOCUMENTS
Taisuke Tsugami, 145 i-chome, Shimoochiai,
Shinjuku-ku, Tokyo, Japan
Filed Aug. 26, 1966, Ser. No. 575,363
Int. Cl. G01n 21/30
U.S. Cl. 250—219
4 Claims

ABSTRACT OF THE DISCLOSURE

Apparatus for testing imprinted sheet material with respect to the genuineness thereof particularly by determining the spectral characteristics of the colored portions of the sheet material. Light-responsive cells are arranged above or beneath the material according to the color configuration thereon so as to receive light transmitted through or reflected from the material. The light-responsive cells are provided with definite spectral composition characteristics to determine the spectral distribution characteristics of the colored portion there to detect. Proper measurement of these colors indicates authenticity. Special filters and lenses are utilized to achieve these ends.

---

This invention relates to a method of and an apparatus for testing imprinted sheet material as represented by paper currency, checks, securities, stamps and the like material with respect to the genuineness or legitimacy of such material. The primary object of the invention is to provide a method of testing such material and particularly one having colored configurations thereon for separation according to the character of the configurations.

Another object of the invention is to provide a testing device particularly adapted to perform the inventive method and which is simple in construction and operable with high accuracy.

The above and other objects and advantages of the present invention will become apparent from the following detailed description when taken in conjunction with the accompanying drawings, in which:

FIG. 2 is a fragmentary cross section of the device showing the relative positions of the light bulbs, the material being tested and the light-responsive cells arranged to receive light rays transmitted through or reflected from the material;

FIG. 3 illustrates one form of light-responsive cell usable in the inventive testing device, in cross section;

FIG. 3A illustrates another form of light-responsive cell fitted with a filter;

FIG. 3B illustrates a further form of light-responsive element fitted with a condenser lens and a filter;

FIG. 10 illustrates the spectral sensitivity characteristics of a number of light-responsive cells including a filter and photoconductive element combination;

FIG. 11 illustrates the spectral distribution of the materials shown in FIG. 5, as measured by a set of filter and photoconductive element combinations; and FIG. 12 illustrates the spectral distribution of the materials shown in FIG. 6, as measured by another set of filter and photoconductive element combinations.

Figure 1:
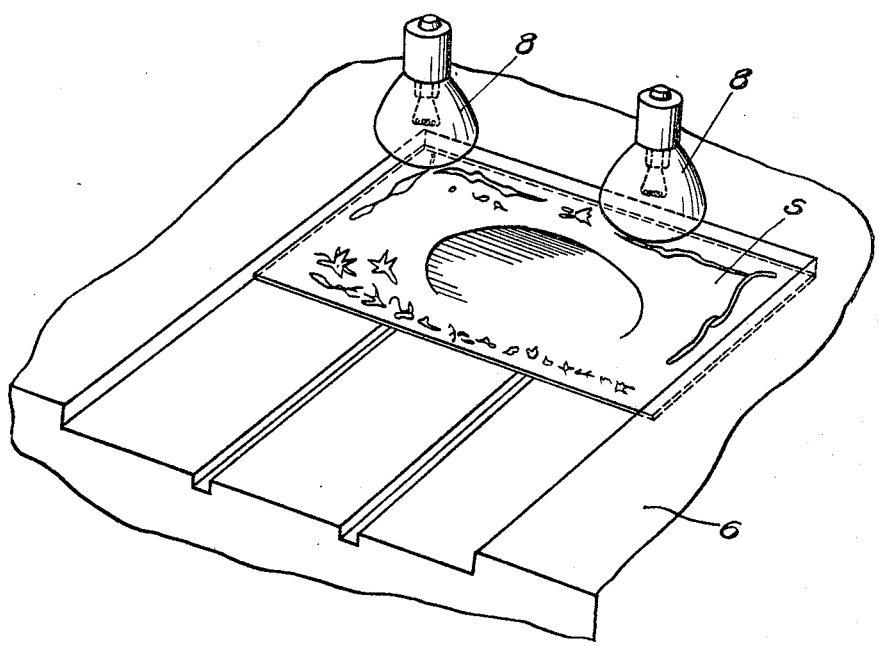
FIG. 1 is a fragmentary perspective view of a bill testing device embodying the concepts of the present invention, which shows the bill positioning and light source means.

In general, material testing devices of the type with which the present invention is concerned comprise a material positioning means, light-responsive cells, light sources and control circuitry therefor, for example, as disclosed in United States Patent No. 3,108,693. The typical arrangement of some components of such conventional testing device is schematically shown in FIG. 1.

The imprinted sheet material to be tested is positioned by the positioning means in a predetermined position on the device and is illuminated by light usually emitted from incandescent light bulbs. The light-responsive cells are arranged above or beneath the material according to the colored configurations thereon so as to receive light transmitted through or reflected from the material. The light-responsive cells used take the form of a tubular casing accommodating a photoconductive element which includes a photoconductor material such as cadmium sulfide. As is well known, the resistance value of such light-responsive cells varies according to the intensity of the light impinging upon the photoconductive element and the material can be tested by utilizing the variation of the cell resistance to obtain necessary operations through the control circuit to accept or reject the material.

Figure 4:
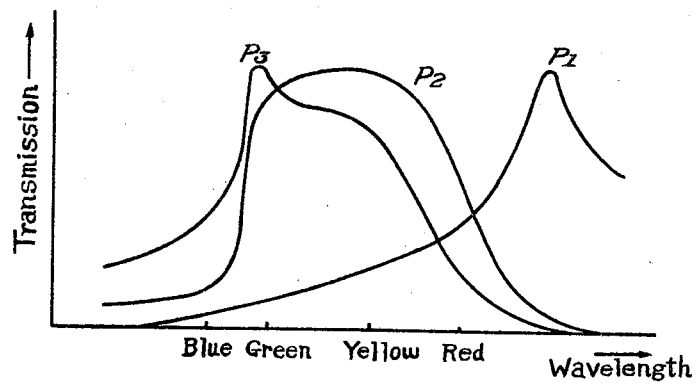
FIG. 4 illustrates the spectral sensitivity of different photoconductive elements and that of the human eye.
Figure 5:
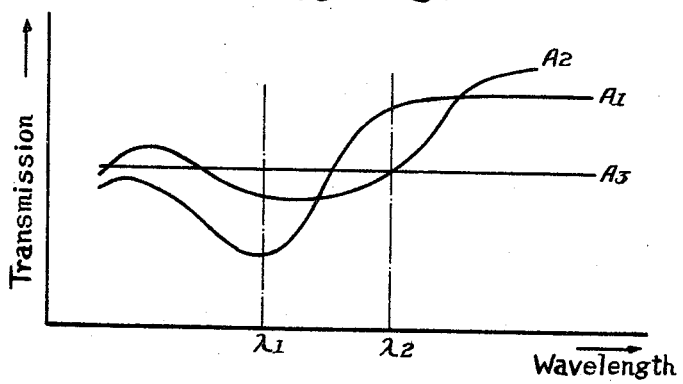
FIG. 5 illustrates the spectral distribution characteristic a few different forms of imprinted material as measured at a particular location thereon.
Figure 6:
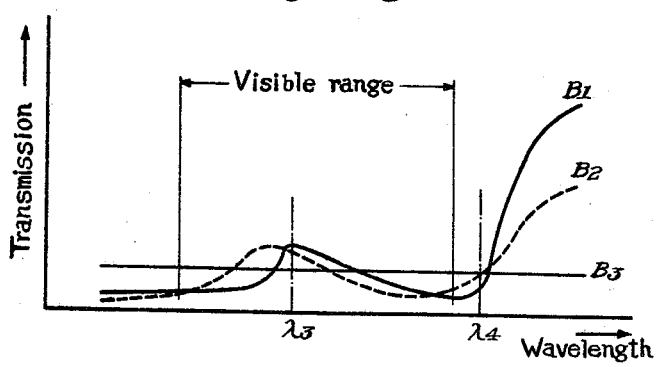
FIG. 6 illustrates the same at another particular location on the imprinted materials.

In such testing device, a number of photoconductive cells having different spectral sensitivity characteristics such as shown in FIG. 4 are arranged to receive rays of light transmitted through or reflected from the material being tested in such positions relative to the imprinted configurations thereon that, whenever the material is genuine, the light impinging upon each of the light-responsive cells will have a definite spectral composition characteristic of the respective portion of the colored imprint on such genuine material. For example, in cases where the light rays impinging upon the cell exhibit such spectral distribution characteristics as shown in FIG 5 at A1 and in FIG. 6 at B1, the spectral distribution characteristics of the material as measured by the use of light-responsive cells of the type indicated by P2 in FIG. 4 will appear as shown by curves A1 in FIG. 7, A1 and B1 in FIGS. 7 and 8, respectively. In FIGS. 5 and 6, curves A2 and B2 represent the spectral distribution characteristics of a colored photocopy of the material obtained by the wet or dry process and giving an appropriate intensity of light transmission or reflection while the lines A3 and B3 represent those of a black-and-white photographic print also giving an appropriate intensity of light transmission or reflection. When measured by light-responsive cells of the type P2, the two forms of material give spectral distributions as indicated at A2, B2 and A3, B3, respectively, in FIGS. 7 and 8. Since a photoconductive cell generally gives measurements as an integration of such spectral distribution, the measurements of A1, A2 and A3 as well as of B1, B2 and B3, obtained with such cell, will be identical with each other and cannot answer the purpose of distinguishing the different forms of material from each other. In other words, the photoconductive cells cannot be used effectively to discriminate between configurations of the same intensity of light transmission or reflection even if the materials are obviously different from each other in color. Even with use of filter means in combination with such photoconductive cells, it will be apparent that the materials, colored or uncolored, cannot be separated from each other with any substantial accuracy since in this case also discrimination between the materials cannot be made effectively as long as they give the same degree of brightness in the pass band of wavelength of the filters.

The present invention is intended to overcome such difficulties encountered with conventional testing devices and thus to enable selection or rejection of materials having colored imprinted configurations thereon with accuracy and by a device of simple construction.

The principles of the invention will next be described with reference to the accompanying drawings.

Figure 9:
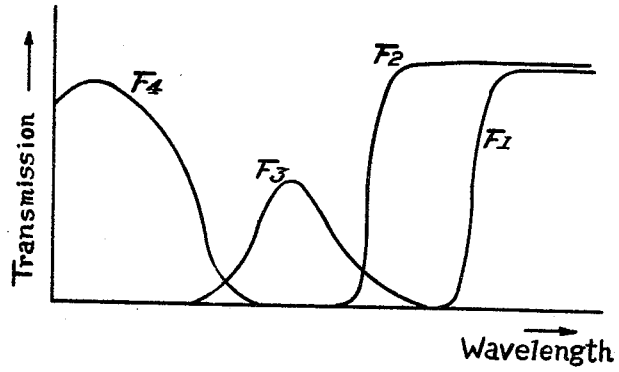
FIG. 9 illustrates the spectral characteristics of a number of different filters.

Assume that a photoconductive cell having a spectral sensitivity characteristic as indicated by P1 in FIG. 4 is combined with a red filter, for example, a cutoff filter having a transmission characteristic as shown in FIG. 9 at F1. A light-responsive cell including such combination obviously will have a sensitivity characteristic as indicated by F1–P1 in FIG. 10, responding solely to light rays in the red region. In practice, such light-responsive cells can be fabricated by employing a color filter 3 of any appropriate type, colored glass, gelatine, or interference, in front of the light-receiving surface of a photoconductive element such as shown in FIG. 3A at 2. As shown, the filter 3 and photoconductive element 2 are fitted in a tubular case 5. The directivity of such light-responsive cell can be improved by an appropriate means, for example, by a condenser lens 4 arranged in the front end of the case 5, as shown in FIG. 3B. The distance $l$ (FIG. 3) between the light-receiving face of the photoconductive element and the front end of the case 5 can be properly adjusted according the light-receiving area of the cell and the imprinted configurations to be tested. In such light-responsive cells photoconductive elements 2 and filter 3 can be employed in various combinations, as described below.

For example, photoconductive elements P1, P2 and P3 having different spectral sensitivity characteristics as shown in FIG. 4 can be combined with filters F1, F2, F3 and F4, which exhibit various transmission characteristics as shown in FIG. 9. As shown in FIG. 10, a light-responsive cell comprising the combination of red filter F1 and photoconductive element P1 exhibits a substantial sensitivity only to light in the red region as indicated by line F1–P1. Similarly, a light-responsive cell comprising the combination of red filter F2 and photoconductive element P2 exhibits a sensitivity only in the red region close to orange as indicated by line F2–P2 in FIG. 10 while the combination of green filter F3 and photoconductive element P3 gives a sensitivity only in a region close to green as indicated by line F3–P3. Further, a light-responsive cell including blue filter F4 and element P3 exhibits a sensitivity only in the blue or bluish violet region as indicated by line F4–P3.

When materials exhibiting at certain characeristic location thereon respective spectral distributions A1 (which is pinkish), A2 and A3, as shown in FIG. 5, are tested at that location by use of light-responsive cells including combinations F4–P3, F3–P3 and F2–P2, respectively, of FIG. 10, the output spectral distributions of the materials as obtained through such combinations will appear as shown in FIG. 11, distinguishably differing from each other particularly in the wavelength regions where such measurement is effectively made by combinations F3–P3 and F2–P2, respectively.

Similarly, when the materials, exhibiting at another characteristic location thereon respective spectral distributions B1, (which is greenish), B2 and B3, as shown in FIG. 6, are tested by light-responsive cells including respective combinations F4–P3, F3–P3 and F1–P1 of FIG. 10, the output distributions obtained will appear as shown in FIG. 12, distinguishably differing from each other particularly in the wavelength region where such measurement is made by combination F1–P1.

The present invention will now be described in further detail from the standpoint of practical application of the invention.

Figure 7:
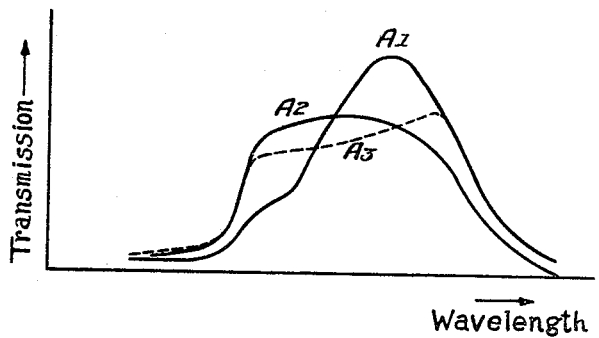
FIG. 7 illustrates the spectral distribution of the materials shown in FIG. 5, as measured by one of the light-responsive cells shown in FIG. 4.
Figure 8:
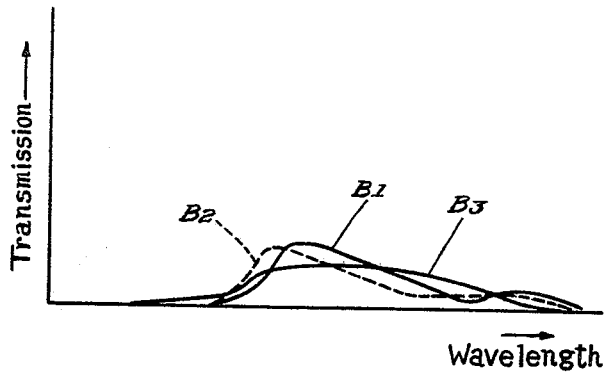
FIG. 8 illustrates the spectral distribution of the materials shown in FIG. 6, as measured by one of the light-responsive cells shown in FIG. 4.

(1) Consideration will be given first to the measurement of light transmitted through or reflected from particular characteristic spots or areas of the colored configurations by use of light-responsive cells which exhibit a spectral sensitivity characteristic over a wide wavelength range as indicated by line P2 in FIG. 4. Such light-responsive cells are selected to have a substantial sensitivity in a required wavelength range and arranged, for example, as shown in FIG. 2 at 1 and 1a. An imprinted sheet material S to be tested if properly positioned by positioning means 6 which includes a guide groove 7. Light bulbs 8 are arranged to illuminate the imprinted surface of sheet material S so positioned. The light transmitted through or reflected from the characteristic areas of the material impinges upon the respective light-responsive cells 1 or 1a, which produce an output as a measure of the brightness of the colored configurations, for example, as shown in FIGS. 7 or 8.

(2) The spectral composition of the light transmitted through or reflected from a material at a location characteristic of the colored configurations imprinted thereon includes a wavelength or wavelengths peculiar to the configurations, for example, $\lambda_1$ and $\lambda_2$ for material A1 in FIG. 5, or $\lambda_3$ and $\lambda_4$ for material B1 in FIG. 6. When such characteristic areas of the colored imprinted sheet material are measured by the arrangement of light-responsive cells shown in FIG. 2, the result obtained will appear as shown in FIG. 11 where the cells have the narrowest possible pass band in the region of the respective characteristic wavelengths, including respective combinations F3–P3 and F2–P2 for wavelengths $\lambda_1$ and $\lambda_2$.

(3) In practice, however, the spectral sensitivity characteristic of light-responsive cells comprising a filter and a photoconductive element of such type as can be fabricated with ease on any industrial basis cannot be very sharp, as illustrated in FIG. 10. Also, the cells cannot at all times be selected to exhibit an effective sensitivity in the wavelength range peculiar to the spectral distribution of the material at the particular location thereon where measurement is to be made, unlike the cell F3–P3, which exhibits a sharp sensitivity, as shown in FIG. 10, in the region of wavelength $\lambda_3$ peculiar to the material B1 of FIG. 6. In such cases, the cell output will not exhibit any feature characteristic of the material, e.g. B1, as observed in FIG. 12 from the lines B1 and B2 obtained with use of combination F3–P3. Moreover, it is to be understood that the material at the location of measurement may not exhibit any spectral distribution which is sufficiently characteristic of the material to enable effective measurement thereof within the visible range outside of such ineffective region including wavelength $\lambda_3$ for material B1. Selection of materials which exhibit such spectral distribution lacking any clear definition in the entire wavelength range can be performed by measuring the colored configurations on the materials by light-responsive cells exhibiting a sensitivity in a shorter wavelength range, for example, like the cell F4–P3 or by those exhibiting a sensitivity in a longer wavelength range, for example, like F2–P2 or F1–P1, or by those exhibiting both features. For example, use of a cell including combination F1–P1 enables distinguishment between the materials in an invisible wavelength range, as observed in FIG. 12.

(4) In practice, light-responsive cells of the type shown in FIGS. 3, 3A or 3B and having spectral sensitivity characteristics of FIG. 10 are properly selected and arranged opposite to the characteristic areas of the imprinted configurations on the material to be tested, as illustrated in FIG. 2. With this arrangement, any counterfeit material having colored configurations thereon cannot meet all of the following conditions to be satisfied by acceptable materials. In this manner, color discrimination between materials can be effected accurately by means of a device of simple construction according to the present invention. For example, materials, A1, A2 and A3 of FIG. 5, or B1, B2 and B3 of FIG. 6 can be discriminated in any of the following manners.

(4.1) The average brightness over the whole spectral range is measured, in the manner described in Section 1 to obtain a result, for example, shown in FIG. 7 and the characteristic portions of the colored configurations on the material are measured in the manner described in Section 2 to obtain a result, for example, shown in FIG. 11. The material is acceptable only when in each measurement coincident data have been obtained.

(4.2) Similarly, the average brightness is measured, for example, in the manner shown in FIG. 8 and further measurements are made over a shorter and/or a longer wavelength range. Materials can be accepted only when in each of the measurements the data obtained are coincident.

(4.3) The average brightness is measured in the manner described above. Also, the characteristic portions of the colored configurations are measured effectively in the manner described in Section 2 and further measured over a shorter and/or a longer wavelength range. Materials can be accepted only when in each of the measurements the data obtained are coincident.

It is to be understood that changes may be made in the details of construction, arrangement and operation without departing from the spirit of the invention or from the scope of the appended claims.

What is claimed is:

1. An apparatus for testing sheet material for authenticity having colored configurations imprinted thereon comprising means to project light onto substantially the entire surface of the material, a plurality of light-responsive elements positioned adjacent the material on both sides thereof at preselected locations to measure the light passage and reflectance characteristics of the material from such locations which is characterized by at least certain of said light-responsive elements having spectral characteristics for responding solely to light having spectral wave lengths in the red region, certain other of said elements having spectral characteristics for responding solely to light having spectral wave lengths in the green region, and the remainder of said elements exhibit a spectral sensitivity characteristic over a wide wave length range to include any and all colors included in the light projected onto the material.

2. An apparatus according to claim 1 which includes a filter associated with certain of the elements particularly adapted to be responsive to the spectral wave length to which the element is responsive.

3. Apparatus according to claim 2 which includes a condenser lens arranged between the material and said certain of the elements to direct the light received thereby onto said certain elements.

4. An apparatus for testing sheet material for authenticity having colored configurations imprinted thereon which includes means to project light onto substantially the entire surface of the material, a plurality of light-responsive elements positioned adjacent the material on both sides thereof to receive reflected and transmitted light from the material where at least one of the elements is sensitive to at least all visible spectral regions of light, at least one of the elements being sensitive to the narrow spectral range of light defined by the primary color of the material, and at least one of the elements being responsive to a narrow spectral region of light other than the spectral region defined by the primary color of the material.

References Cited

UNITED STATES PATENTS

| Re. 26,176 | 3/1967 | Steiner. |
|---|---|---|
| 2,941,187 | 6/1960 | Simjain. |
| 3,109,100 | 10/1963 | Gecewicz. |
| 3,239,814 | 3/1966 | Willie. |
| 3,304,432 | 2/1967 | Leingang et al. |
| 3,360,653 | 12/1967 | Phares. |
| 2,938,424 | 5/1960 | Herriott _____ 356—178 |

RALPH G. NILSON, Primary Examiner

C. M. LEEDOM, Assistant Examiner

U.S. Cl. X.R.

356—71, 178